United States Patent
Tariq

(10) Patent No.: US 11,631,094 B2
(45) Date of Patent: Apr. 18, 2023

(54) PRE-COMPUTING DATA METRICS USING NEURAL NETWORKS

(71) Applicant: IMS Health Incorporated, Danbury, CT (US)

(72) Inventor: Mir Tariq, Kirkland, WA (US)

(73) Assignee: IQVIA Inc., Parsippany, NJ (US)

( * ) Notice: Subject to any disclaimer, the term of this patent is extended or adjusted under 35 U.S.C. 154(b) by 925 days.

(21) Appl. No.: 15/014,376

(22) Filed: Feb. 3, 2016

(65) Prior Publication Data

US 2017/0220947 A1 Aug. 3, 2017

(51) Int. Cl.
*G06Q 30/02* (2012.01)
*G06N 3/02* (2006.01)
*G06Q 30/0202* (2023.01)

(52) U.S. Cl.
CPC .......... *G06Q 30/0202* (2013.01); *G06N 3/02* (2013.01)

(58) Field of Classification Search
CPC ...... G06N 3/088; G06N 3/02; G06Q 30/0202; G06F 16/2462; G06F 16/245; G06F 16/24549; G06F 16/2453
See application file for complete search history.

(56) References Cited

U.S. PATENT DOCUMENTS

| | | | |
|---|---|---|---|
| 6,965,886 B2 | 11/2005 | Govrin et al. | |
| 9,026,479 B1* | 5/2015 | Baluja | G06N 5/04 706/12 |
| 2004/0111410 A1* | 6/2004 | Burgoon | G06F 16/2462 |
| 2006/0122976 A1* | 6/2006 | Baluja | G06F 3/0482 |
| 2011/0055202 A1* | 3/2011 | Heimendinger | G06F 16/245 707/721 |
| 2011/0072007 A1* | 3/2011 | Le Pennec | G06F 16/24539 707/718 |
| 2014/0207592 A1* | 7/2014 | Kavis | G06Q 40/12 705/21 |
| 2014/0278379 A1* | 9/2014 | Coccaro | G10L 15/1822 704/202 |
| 2016/0357544 A1* | 12/2016 | Lewallen | G06F 17/30598 |

OTHER PUBLICATIONS

Wysocki, Antoni, and Maciej Ławryńczuk. "Jordan neural network for modelling and predictive control of dynamic systems." Methods and Models in Automation and Robotics (MMAR), 2015 20th International Conference on. IEEE, 2015. (Year: 2015).*

Hastie, Trevor, Robert Tibshirani, and Jerome Friedman. "The elements of statistical learning: data mining, inference, and prediction, Springer Series in Statistics." (2009): 389-416. (Year: 2009).*

* cited by examiner

*Primary Examiner* — Markus A. Vasquez
(74) *Attorney, Agent, or Firm* — Fish & Richardson P.C.

(57) ABSTRACT

Methods, system, and apparatus for pre-computing data metrics. A method can include receiving, by one or more computers, (i) data from a user including a plurality of data metrics, and (ii) historical data associated with the user; generating, by the one or more computers and based at least on the historical data associated with the user, a forecast for the user using an artificial neural network, the forecast indicating a prediction of future user behaviors; determining, by the one or more computers and based at least on the forecast for the user, a subset of data metrics, from among the plurality of data metrics, that are likely to be used by the user; performing, by the one or more computers, one or more automatic data operations on the subset of data metrics; and providing, by the one or more computers, the processed subset of data metrics for output.

15 Claims, 5 Drawing Sheets

PRE-COMPUTING DATA METRICS USING NEURAL NETWORKS

FIELD

The present specification relates to pattern recognition, and more specifically, predictive analytics using neural networks.

BACKGROUND

Artificial neural networks refer to a family of statistical models that can be used to approximate functions that depend on a large number of inputs. For instance, artificial neural networks can include sets of adaptive weights such as numerical parameters that are adjusted by a learning algorithm.

SUMMARY

Modern database systems often exhibit problems with computational efficiency due to significantly large data volumes received from distributed data sources. For instance, raw data from data sources often need to be gathered, organized, and additionally processed in order to generate aggregate data metrics that are used for predictive analytics. Although raw data can be reorganized into data structures in computer memory that optimize data aggregation, these techniques are often unable to selectively perform data operations on specific data metrics that are predicted to useful to a user.

Accordingly, one innovative aspect of the subject matter described in this specification can be embodied in methods that utilize statistical machine learning techniques using an artificial neural network to predict a set of data metrics that are likely to be used by a user, and pre-compute aggregate values for only such metrics to conserve computation resources during data operations for the user. For instance, historical data of the user can be used to initially determine a forecast of user behavior for the user, and then use pattern recognition to predict data metrics associated with the forecast for the user.

In some aspects, the subject matter described in this specification may be embodied in methods that may include: receiving, by one or more computers, (i) data from a user including a plurality of data metrics, and (ii) historical data associated with the user; generating, by the one or more computers and based at least on the historical data associated with the user, a forecast for the user indicating a prediction of future user behaviors using an artificial neural network, the artificial neural network including a input layer, a hidden layer, and an output layer; determining, by the artificial neural network and based at least on the forecast for the user, a subset of data metrics, from among the plurality of data metrics, that are likely to be used by the user; performing, by the one or more computers, one or more automatic data operations on the subset of data metrics; and providing, by the one or more computers, the processed subset of data metrics for output.

Other versions include corresponding systems, apparatus, and computer programs, configured to perform the actions of the methods encoded on computer storage devices.

These and other versions may each optionally include one or more of the following features. For instance, in some implementations, for the artificial neural network: the input layer includes a plurality of input nodes each receive a subset of the historical data indicating different user behaviors, the hidden layer includes a plurality of hidden nodes that each approximate future user behaviors based on a trained statistical model for the user, and the output layer includes one or more output nodes that generate a prediction of the future user behaviors.

In some implementations, the method includes: receiving, by the one or more computers, a list of data metrics that have been previously determined to be used by the user; computing, for each metric within the list of data metrics that have been previously to be previously used by the user and based at least on the forecast for the user, a probability score that indicates a likelihood that a particular data metric will be used by the user; and training the artificial neural network based at least on the probability scores for the list of data metrics that have been determined to be previously used by the user.

In some implementations, the method includes: after generating the forecast for the user, receiving data indicating one or more products associated with the user; processing the data indicating the one or more products using the artificial neural network; determining that that the prediction of future user behaviors has changed; and in response to determining that that the prediction of future user behaviors has changed, adjusting the forecast for the user based at least on the data indicating one or more products.

In some implementations, the historical data associated with the user includes prior data queries submitted by the user.

In some implementations, the historical data associated with the user includes historical data for one or more other users that are determined to be similar to the user.

In some implementations, determining the subset of data metrics that are likely to be used by the user includes: computing, for each of the plurality of data metrics and based at least on the historical data associated with the user, a probability score indicating a likelihood that a particular data metric will be used by the user; comparing the value of the probability score for each of the plurality of data metrics to a threshold value; and designating a subset of the plurality of data metrics that have probability score values greater than the threshold value as the subset of data metrics that are likely to be used by the user.

In some implementations, performing the one or more automatic data operations on the subset of data metrics includes computing a set of aggregate metrics for the subset of data metrics.

In some implementations, the set of aggregate metrics for the subset of data metrics are computed prior to initializing a data analysis application, and the set of aggregate metrics for the subset of data metrics are locally stored on the client device of the user.

In some implementations, providing the processed subset of data metrics for output includes providing the processed subset of data metrics to a data analysis application.

In some implementations, providing the processed subset of data metrics for output includes configuring the processed subset of data metrics for display on a data analytics dashboard.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

In general, the subject matter described in this specification may involve methods that utilize statistical machine learning techniques using an artificial neural network to predict a set of data metrics that are likely to be relevant to a user, and pre-compute aggregate values for only such data metrics to conserve computation resources during subsequent data operations. For instance, pattern recognition analysis of historical data of the user can be used to initially determine a forecast of user behavior for the user, and then an artificial neural network can be used to predict data metrics associated with the forecast of the user.

As used throughout, "data metrics" refer to a set of mathematical techniques or tools for transformation of raw data into useful information for metrics for data analysis. For instance, the data metrics can provide quantitative information related to business activities of organizations such as pharmaceutical companies, hospitals, or research institutions, or other types of information related to data that is gathered from distributed sources. For example, data metrics can include quantitative information related to various data variables such as pharmaceutical sales, marketing costs, insurance claims, or diagnostic tests.

Figure 1A:
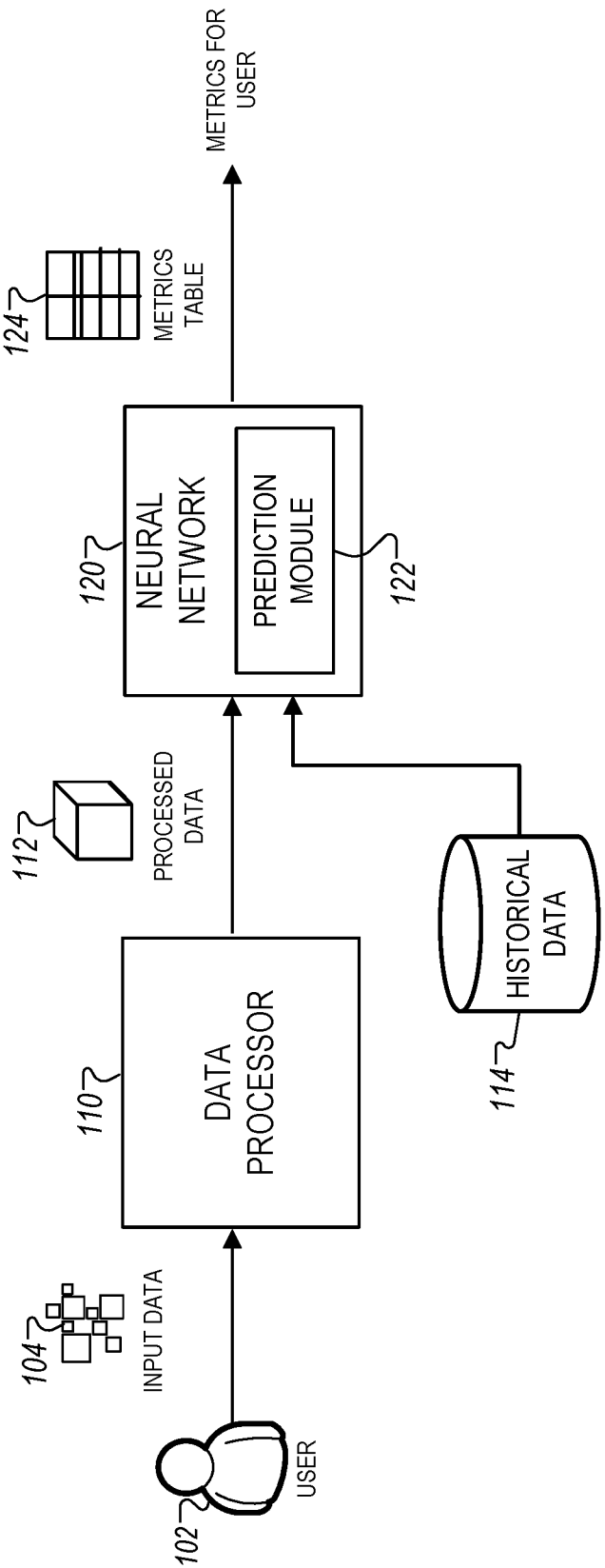
FIG. 1A is a diagram that depicts an example of a system for predicting data metrics that are associated with a user.

FIG. 1A is a diagram that depicts an example of a system 100 for predicting data metrics that are associated with one or more users. Briefly, input data 104 from a user 102 can be received by a data processor 110, which generates processed data 112. The processed data 112 can then be transmitted to an artificial neural network 120, which also receives historical data 114 and generates a metrics table 124. The artificial neural network 122 can include a prediction module 122 that determines a forecast for the user based on the historical data 114. The output of the system 100 is a set of data metrics that are likely to be used by the user 102a.

In more detail, the input data 104 can be raw data including one or more data metrics. As used throughout, data metrics refer to a set of techniques and tools for transformation of raw data into useful information for data analysis. In some implementations, the input data 104 is a spreadsheet file that includes multiple data columns for different data metrics and values for variables associated with a particular business activity. For instance, the input data 104 can include categorical data that includes values for each category over a particular period of time. In one example, the input data 104 can include pharmaceutical sales data for distributors in various geographical markets over a three-year time period. In this example, the input data includes data values that describe the gross revenue for pharmaceutical sales over the three-year time period for each distributor.

Alternatively, in other implementations, the input data 104 is user-submitted data on a data analysis application for a particular healthcare organization. For instance, the input data 104 can be a user input that manually enters data values, as described above, or a file upload for a data file that includes one or more data metrics. In such implementations, the input data 104 can be extracted from the data analysis application and transmitted to the data pre-processor as a data package.

The data processor 110 can be a software module that is capable of manipulating items of data of the input data 104 to generate the processed data 112. The data processor 110 can be configured to perform various automatic data processes such as validation, sorting, summarization, aggregation, analysis, reporting or classification. In one particular example, the data processor 110 gathers the input data 104 and organizes different subsets of the input data 104 into relational databases. In another example, the data processor 110 identifies particular data variables of interest (e.g., monthly sales data) and performing operations to generate aggregate data variables (e.g., yearly sales data). As described more particularly with respect to FIG. 2, the data processor 110 can also generate data structures for the input data 104 in order to reduce the amount of computational resources required to perform the automatic data processes.

In some implementations, the data processor 110 can be a component of a commercial data analysis application that is used by healthcare organizations in order to analyze industry and business trends. In such instances, the commercial data analysis application can be a cloud-based application that is configured to exchange communications with a central data warehouse in order to obtain purchase and link data. The obtained data can then be hosted on the commercial data analysis application to provide access to users over the Internet using a web browser.

The processed data 112 can represent data structures generated by the data processor 110 to more effectively perform data computations on the input data 104. In some implementations, as depicted in FIG. 1A, the processed data 112 can be a multi-dimensional array of data such as an online analytical processing (OLAP) cube that is used to analyze the input data 104 for data insights. For example, the processed data 112 can be a summary of financial data by product, by time period, or by geographical location to compare actual and budget expenses. In this example, the product, time, city and business scenario (e.g., actual and budget expenses) represent dimensions of the processed data 112.

In other implementations, the processed data 112 can be a multi-dimensional array of data that is processed using a distributed processing system. In such implementations, the data processor 110 can initially pre-compute aggregate metrics for the input data 104 and store the aggregate metrics locally in a read-efficient manner. The pre-computed aggregate metrics are then processed using multiple computing devices as described above.

After generating the processed data 112, data processor 110 transmits the processed data 112 to the artificial neural network 120. The artificial neural network 120 can be a family of statistical data models that are used to determine or predict data metrics within the processed data 112 that are likely to be used by the user 102 in a subsequent user session. For instance, as described more particularly with respect to FIG. 2, the artificial neural network 120 can be trained to forecast user behavior based on mapping user activity data to data metrics that were previously used by the user 102. In such instances, the artificial neural network 120 can be trained using historic data for the user 102, simulated data for the user 102, historical data for other similar users, or simulated data for similar other users.

In general, the artificial neural network 120 can determine relationships between the input data 104 and identifies a set of data metrics that are likely to be used by the user 102. For example, the artificial neural network 120 can initially use pattern recognition analysis on historical data of the user 102 to determine how frequently each of the individual intelligence metrics associated with the input data 104 have been previously used by the user 102. The artificial neural network 120 can then assign a relative importance score to each data metric based on the frequency of use by the user 102. In other instances, the relative importance score can be based on other types of usage parameters. For example, the relative importance score can be based on the amount of data associated with the user 102 that have been impacted by each of the relative importance scores.

The artificial neural network 120 can include a prediction module 122 that determines a forecast for the user 102 based on the historical data 114. The forecast for the user 102 refers to a prediction of subsequent user activity based on a set of user signals indicated by the historical data 114. For instance, the user data 102 can include a geographic location of the user 102, indications of products or organizations of interest, or historical activity data for the user 102 or other users that are determined to be similar to the user 102. Examples of historical activity data can include prior queries submitted by the user 102, prior queries submitted by similar user. In other instances, the historical data 114 can indicate relationships between the user 102 and healthcare organizations included within the input data 104. For example, the historical data 114 can indicate whether the user 102 is a consumer, a healthcare provider, a product manufacturer, or a market professional.

The forecast of the user 102 can be used by the prediction module 122 to determine a set of data metrics that are likely to be used by the user 102 in a subsequent user session. For instance, the forecast of the user 102 can be used by the prediction module to determine reoccurring user activities, user preferences, product usage patterns, and/or subscribed services. The prediction module 122 can then use machine learning techniques to determine a set of data metrics that are likely to be used by the user 102. For example, in some instances, the prediction module 122 may use a mapping between user activities and relevant data metrics to determine a set of corresponding data metrics for the user attributes indicated by the forecast for the user 102.

After determining a set of data metrics that are likely to be used by the user 102, artificial neural network 120 generates the metrics table 124. The metrics table 124 can be a lookup table of selected data metrics by the prediction module 122. In this regard, the metrics table 124 can be used to prioritize specific data metrics that have been identified to be important to the user 102 and pre-calculate the specific data metrics within the metrics table 124 instead of calculating all available data metrics, which can lead to enhancements in computational efficiency and reduction of data processing times in resource-limited environments such as limited RAM availability for performant access.

In some implementations, the metrics table 124 can be pre-computed and locally within memory of a client device prior to initiating a data operation during a subsequent user session on the client device. For instance, during a subsequent data operation for the user 102, a data analysis application on the client device can retrieve the metrics table 124 from memory and compute aggregate values for the selected data metrics only. In this regard, the metrics table 124 can be used to improve the speed and efficiency of data operations performed on a client device by accessing a locally stored metrics table 124.

In one particular example of the system 100, the data processor 110 and the artificial neural network 120 are components of a data analysis application that runs on a client device. The historical data 114 includes activity data of the user 102 on the client device (e.g., applications used, location information, text queries submitted, etc.) in addition to activity data of the user 102 on the data analysis application (e.g., data queries submitted, reporting tools used, etc.). The historical data 114 is used by the prediction module 122 to determine a user forecast, which is then used to generate the metrics table 124 that is locally stored on the memory of the client device. In this example, if the data analysis application has access to data for multiple healthcare providers, but the historical data 114 and the user forecast indicates that the user 102 is only associated one of the healthcare providers, the data analysis application only computes aggregate values for healthcare providers for one healthcare provider. In this regard, the metrics table 124 can be used to determine subsets of accessible data that is useful to a particular user in order to reduce computational resources needed to generate useful results for the particular user.

Figure 1B:
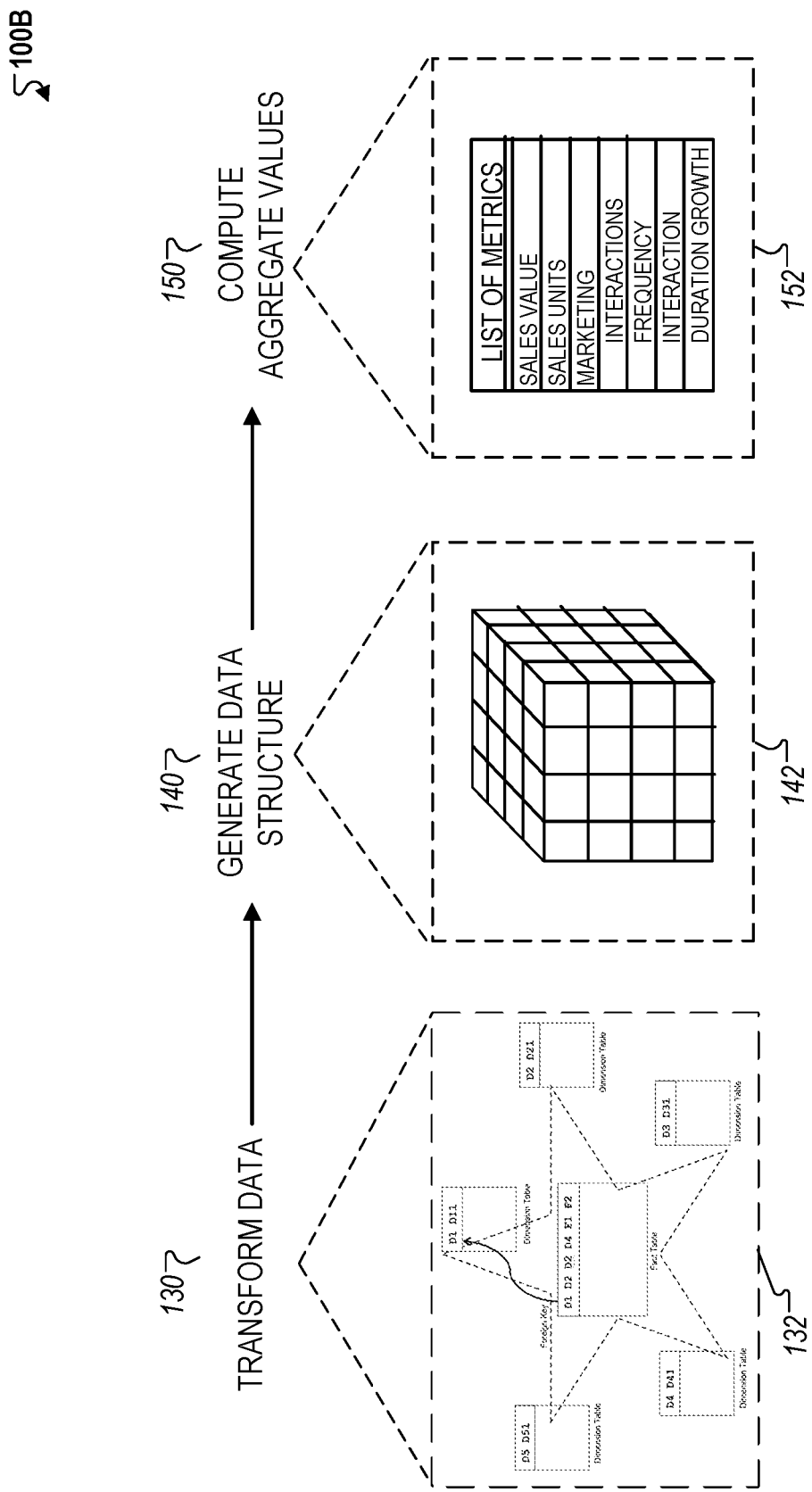
FIG. 1B is a diagram that depicts an example of a process for computing data metrics.

FIG. 1B is a diagram that depicts an example of a process 100B for computing data metrics. Briefly, the process 100B can include performing data transformations (130), generating data structures (140), and computing aggregate values for data metrics (150). In some implementations, the process 100B can be executed by the data processor 110 as described previously with respect to FIG. 1A.

The process 100B initially includes performing data transformations (130). For instance, raw input data can initially be transformed into a data mart schema of a data warehouse. In some implementations, as depicted in FIG. 1B, the input data can be transformed into a star schema 132 that consists of one or more fact tables containing numerical values or measures for data variables associated with a healthcare organization (e.g., sales data). The numerical values or measures also reference a number of dimensional tables that can include attributes that describe the input data (e.g., products, geography, timeline, etc.).

After transforming the raw input data, the process 100B includes generating data structures (140). For instance, data structures can be generated to calculate aggregate values for data metrics (e.g., total sales data for a fiscal year). In some implementations, as depicted in FIG. 1B, the data structure generated can be a multi-dimensional array of data such as an OLAP cube 142. In such implementations, related values within the OLAP cube 142 can be stored with proximities in memory such that the use of OLAP cube 142 enables faster calculation of aggregate values for data variables. Alternatively, in some implementations, as described previously with respect to FIG. 1A, the data structure can be data arranged with columnar database and used with a distributed computing system to process data operations in parallel. In other implementations, a combination of the OLAP cube 142 and the distributed computing system can be used for aggregation of multi-dimensional time series data.

In some implementations, generating data structures such as the OLAP cube 140 can be an optional step within the process 100B. For instance, as described previously with respect to FIG. 1A, prediction module 122 can determine a forecast for a user based on the historical data 114 indicating historical data associated with the user. In such implementations, instead of generating the OLAP cube 140, a list of data metrics can be identified based on techniques described previously with respect to FIG. 1A. In this regard, the use of the artificial neural network 120 to generate the metrics table 124 can be used as a less computational resource-intensive method to compute aggregate values for data variables.

After generating data structures, process 100B finally includes computing aggregate values for data metrics (150). For instance, as described previously with respect to FIG. 1A, aggregate values can be computed by summing, counting, or performing a particular mathematical operation on individual numerical values within the data structures generated in step 140. As depicted in examples in FIG. 1B, aggregate values can be computed for the list of metrics 152. In some implementations where a predicted user forecast is used to determine the set of data metrics that are likely to be used by a user, the list of metrics 152 corresponds to the metrics table 124.

Figure 2:
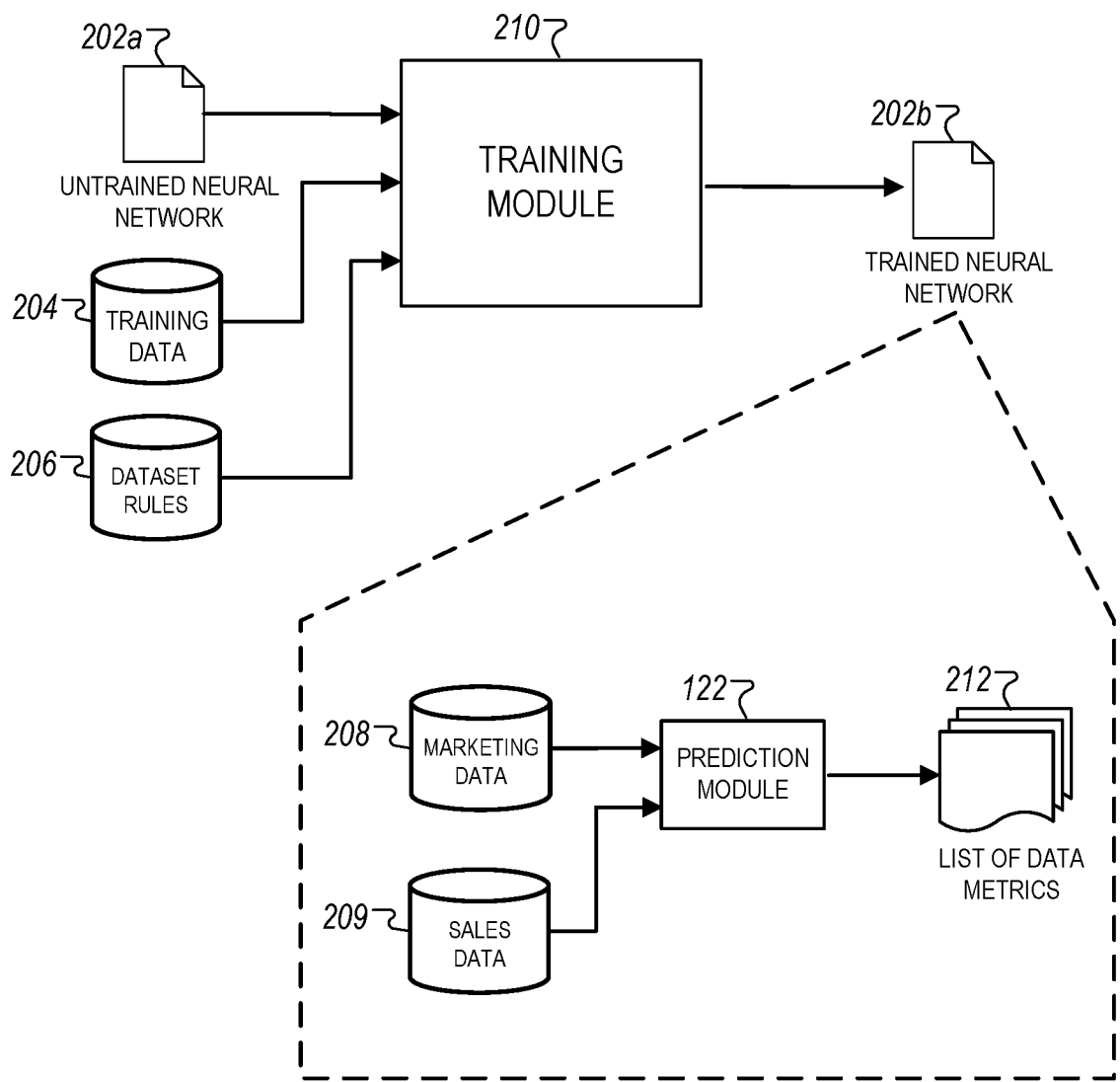
FIG. 2 is a diagram that depicts an example of a system for using machine learning techniques to train an artificial neural network.

FIG. 2 is a diagram that depicts an example of process 200 for using machine learning techniques to train the artificial neural network 120. Briefly, a training module 210 can receive an untrained artificial neural network 202a, training data 204, and dataset rules 206 and generate a trained artificial neural network 202b. After training the untrained artificial neural network 202a, the train artificial neural network 202b can receive marketing data 208 and sales data 209 in order to predict a list of metrics 212 that are likely to be associated with the user.

In more detail, the untrained artificial neural network 202a can represent a baseline or general artificial neural network that is provided for all users of a data analysis application. For example, the untrained artificial neural network 202a can be generated after a user initially installs the data analysis application on a client device, or uses new dataset from the central data warehouse that has never previously been used. The untrained artificial neural network 202a is then trained by the training module 210 as more historical data 114 is generated for the user from prior user sessions.

The training data 204 can be either historical data such as the historical data 114, as described with respect to FIG. 1A, or simulated data for a user. In the first instance, historical data is used characterize relationships between user activity and data metrics in order to predict data metrics that the user may use when performing similar actions in a subsequent user session. For example, if the historical data indicates that the user periodically uses a particular data metric with a particular dataset, then the training data can be used to infer that the particular data metric may be used by the user in a subsequent user session with the same dataset.

In the second instance, simulated data can be artificially generated data that is representative of user activity of a user but not actually data generated by the user. For instance, simulated data can be generated based on clustering data from other users that are determined to be similar to the user. In one example, if a user frequently uses data associated with a particular healthcare organization (e.g., experimental data from a research institution), then the simulated data can include other types of experimental data from the same research institution generated by other users. In this example, the simulated data includes data from the other users who are determined to be similar based on a common data source. In another example, simulated data for a user that is a pharmaceutical sales representative can include data from other pharmaceutical sales representatives from other companies that share a similar industry role with the user.

The dataset rules 206 can be a set of training requirements associated with the training data 204. The dataset rules 204 can be a set of association rules that identify relationships between individual variables within the training data. For example, an association rule can specify that input data for pharmaceutical sales data for multiple geographic regions is usually associated with net profit for each geographic region. In other instances, the dataset rules 206 can be a set of ripple down rules (RDR) that describe techniques for knowledge acquisition during a training operation by the training module 210. For instance, RDR can specify conditional logic that indicates position and negative conditions associated with a training event. In each of these examples, the dataset rules 206 can be used to determine when the untrained artificial neural network 202a have been sufficiently trained by the training module 210 and/or identify further training events required to sufficiently train the untrained artificial neural network 202a to generate the trained artificial neural network 202b.

After training the untrained artificial neural network 202a, the training module 210 can provide the trained artificial neural network 202b for determining the list of metrics 212. For instance, the trained artificial neural network 202b provided for output can correspond to the artificial neural network 120 of the system 100. As described with respect to FIG. 1, the prediction module 122 can receive the historical data 114 to predict a forecast of a user, and then determine data metrics that are associated with the forecast. In the examples depicted in FIG. 2, examples of the historical data 114 can include marketing data 208 and sales data 209.

Figure 3:
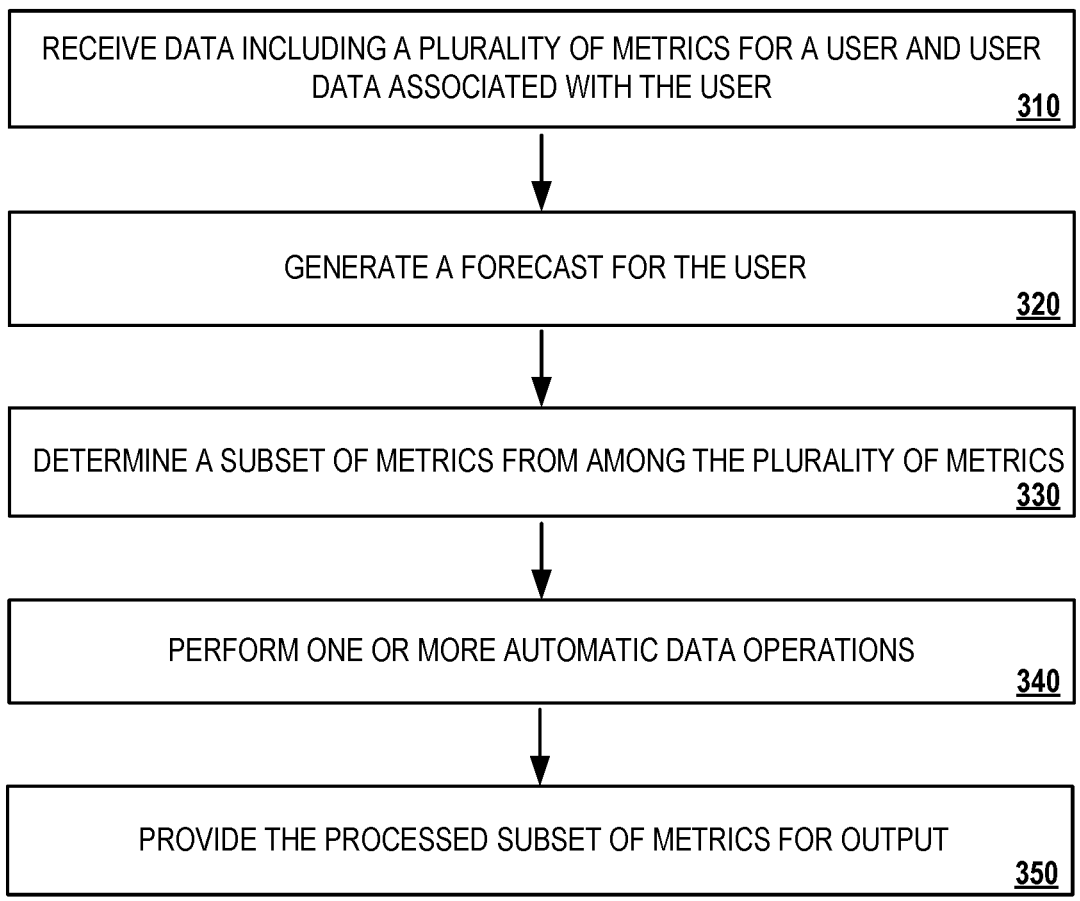
FIG. 3 is a diagram that depicts an example of a process for pre-computing data metrics.

FIG. 3 is a diagram that depicts an example of a process 300 for pre-computing data metrics. Briefly, the process 300 can include receiving data including a plurality of data metrics from a user and user data associated with the user (310), generating a forecast for the user (320), determining a subset of data metrics from among the plurality of data metrics (330), performing one or more automatic data operations (340), and providing the processed subset of data metrics for output (350).

In more detail, the process 300 can include receiving data including a plurality of data metrics from a user and user data associated with the user (310). For instance, as described previously, the artificial neural network 120 can receive the processed data 112, which can include a plurality of data metrics from the user 102. The artificial neural network 120 can additionally receive the historical data 114 associated with the user 102.

The process 300 can include generating a forecast for the user (320). For instance, the prediction module 122 of the artificial neural network 120 can generate a forecast for the user 102. As described previously, the forecast can include a prediction of future user activity based on using pattern recognition techniques on a set of user signals indicated by the historical data 114. In some instances, the prediction module 112 can compare the user signals indicated by the historical data 114 to user behaviors included in a statistical model for the user in order to predict future user activity.

The process 300 can include determining a subset of data metrics from among the plurality of data metrics (330). For instance, the artificial neural network 120 can identify a set of data metrics that are likely to be used by the user 102 in a subsequent user session. The set of data metrics can be identified based on initially applying pattern recognition and machine learning techniques to map particular data metrics to user activities included within historical user activity, and then correlating predicted user activities within the forecast to corresponding user activities within the historical user activity.

The process 300 can include performing one or more automatic data operations (340). For instance, automatic data operations can be performed on the set of data metrics that are determined to be likely used by the user 102. In some examples, the automatic data operations can include computing aggregate values for the set of data metrics. In some implementations, aggregate values for the set of data metrics can precomputed and be included in the metrics table 124 for access during a subsequent user session by the user 102.

The process 300 can include providing the processed subset of data metrics for output (350). For instance, in some examples, the aggregate values for the set of data metrics that are determined to be likely used by the user 102 can be stored in the metrics table 124, and locally stored on a client device of the user 102. In other examples, the metrics table 124 can be provided for use on a commercial data analysis application that is used by the user 102. In each of these examples, the aggregate values for the data metrics can be pre-computed prior to initiating a subsequent data operation for the user 102 such that the use of the metrics table 124 reduces the computation resources required to perform the subsequent data operation for the user 102.

Figure 4:
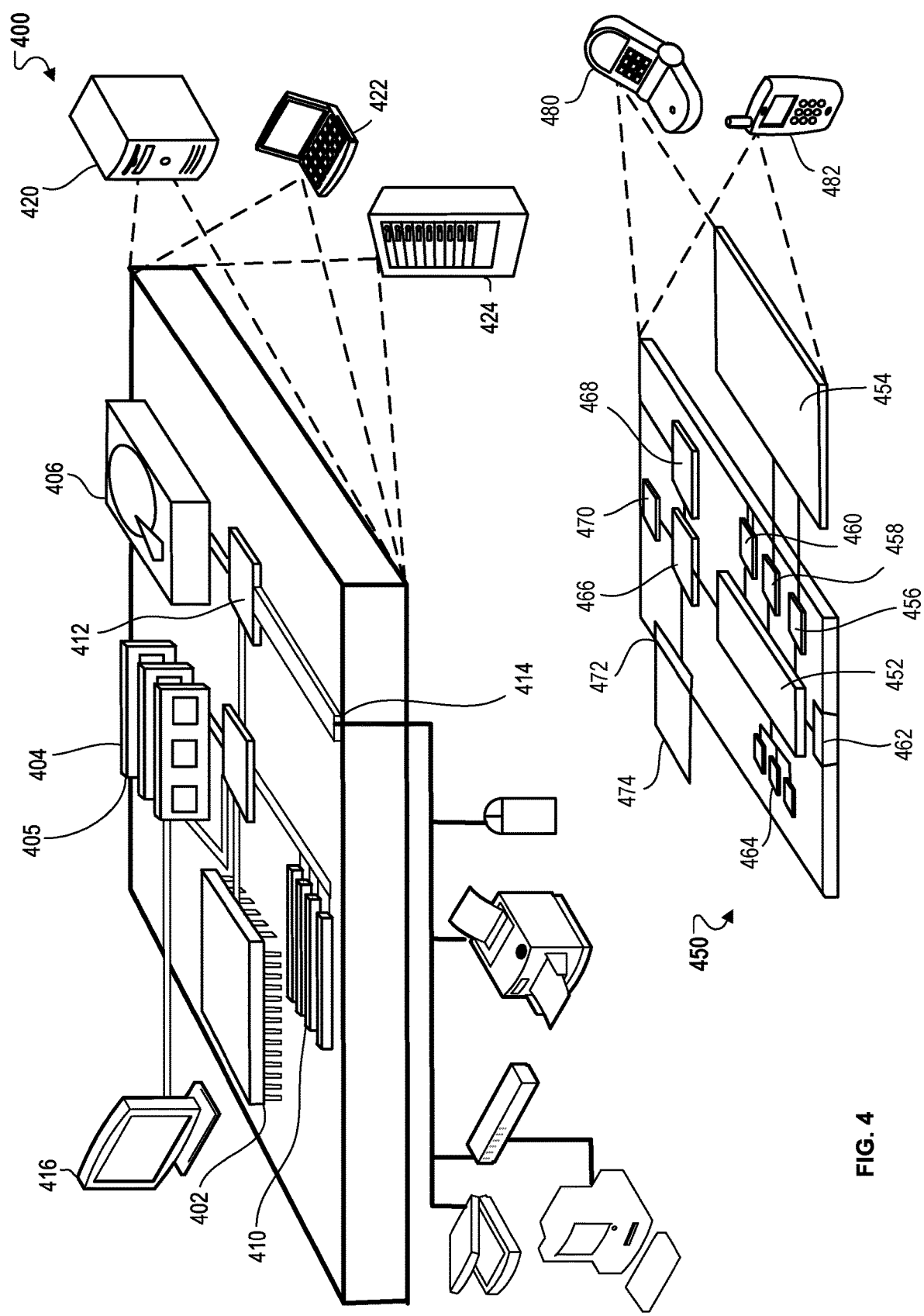
FIG. 4 is a block diagram of computing devices on which the processes described herein, or portions thereof, may be implemented.

FIG. 4 is a block diagram of computing devices 400, 450 that may be used to implement the systems and methods described in this document, as either a client or as a server or plurality of servers.

Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally, computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations, e.g., as a server bank, a group of blade servers, or a multi-processor system.

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth intensive operations. Such allocation of functions is exemplary only. In one implementation, the high-speed controller 408 is coupled to memory 404, display 416, e.g., through a graphics processor or accelerator, and to high-speed expansion ports 410, which may accept various expansion cards (not shown). In the implementation, low-speed controller 412 is coupled to storage device 406 and low-speed expansion port 414. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter. The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, and an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be providing in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be providing as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound, e.g., voice messages, music files, etc. and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   obtaining first data indicative of a set of historical actions performed by a set of users through an application;
   generating, based on clustering the first data, second data indicative of a set of simulated historical actions performed by the set of users, wherein the second data reproduce statistical properties of the first data;
   determining, for each historical action indicated by the first data, a first likelihood of use by a user at a later time point, wherein the user belongs to the set of users;
   determining, for each simulated historical action indicated by the second data, a second likelihood of use by the user at a later time point;
   training, based at least on the first and second likelihoods, a neural network model configured to determine a user forecast indicative of a set of future actions to be performed by the user, wherein the neural network comprises an input layer, a hidden layer, and an output layer;
   determining, based on accessing the neural network model, a user forecast of a first user, wherein the user forecast is indicative of a set of future actions to be performed by the first user through the application at a later time point, and the user forecast includes a set of data metrics accessible through the application;
   obtaining, for each data metric of the user forecast of the first user, an importance score, wherein the importance score is based on frequency of use of a respective data metric by the first user;
   selecting, based on the importance score for each of the data metrics, a subset of data metrics from the set of data metrics, wherein the subset of data metrics only includes data metrics that are predicted to be used by the first user in a data processing operation at the later time point;
   generating a metric table, wherein the metric table includes a set of quantitative information, wherein each quantitative information is associated with a corresponding one of the data metrics of the subset of data metrics, and wherein generating the metric table comprises:
   transforming the first data and the second data into a star schema that includes one or more fact tables;
   determining, based on applying a first data metric to the star schema, first quantitative information for the first data metric included in the subset of data metrics, wherein the first data metric is associated with a first future action included in the set of future actions;
   determining, based on applying a second data metric to the star schema, second quantitative information for the second data metric included in the subset of data metrics, wherein the second data metric is associated with a second future action that is (i) included in the set of future actions and (ii) different from the first data metric;
   determining, based on the first and the second quantitative information, aggregated quantitative information; and
   storing the first quantitative information, the second quantitative information, and the aggregated quantitative information in the metric table; and
   providing the metric table, wherein the metric table is accessible before the set of future actions is performed by the first user.

2. The method of claim 1, wherein:
   the input layer includes a plurality of input nodes each of which receives a subset of the data indicating historical actions performed by the user through the application, each subset representing a different feature of user behavior exhibited by the user when previously using the application;
   the hidden layer includes a plurality of hidden nodes that each approximates the set of future actions based on a trained statistical model for the user; and
   the output layer includes one or more output nodes that determine the set of future actions.

3. The method of claim 1, comprising:
   after determining the user forecast of the first user, receiving data indicating one or more products associated with the first user;
   identifying, using the neural network model, a second subset of data metrics, from among the set of data metrics, that correspond to the one or more products associated with the first user;
   determining that the user forecast of the first user has changed based on the second subset of data metrics; and
   in response to determining that the user forecast of the first user has changed, adjusting the user forecast of the first user based at least on the data indicating one or more products.

4. The method of claim 1, wherein the set of historical actions performed by the set of users comprises prior data metrics computed by the set of users through the application.

5. The method of claim 1, wherein the set of users comprise one or more other users that are determined to be similar to the first user.

6. The method of claim 1, wherein selecting the subset of data metrics comprises:
   computing, for each data metric included in the set of data metrics, likelihood that a particular data metric will be used by the first user through the application at the later time point, wherein the likelihood is computed based on the set of historical actions; and designating data metrics that have likelihoods greater than a threshold value as being included in the subset of data metrics.

7. The method of claim 1, wherein the metric table is locally stored on a client device of the first user.

8. The method of claim 7, wherein providing the metric table comprises configuring the client device to execute the application at the later time point such that the first quantitative information, the second quantitative information, and the aggregated quantitative information are displayed on a data analytics dashboard provided through the application.

9. A system comprising: one or more computers; and
a non-transitory computer-readable medium coupled to the one or more computers having instructions stored thereon, which, when executed by the one or more computers, cause the one or more computers to perform operations comprising:
obtaining first data indicative of a set of historical actions performed by a set of users through an application;
generating, based on clustering the first data, second data indicative of a set of simulated historical actions performed by the set of users, wherein the second data reproduce statistical properties of the first data;
determining, for each historical action indicated by the first data, a first likelihood of use by a user at a later time point, wherein the user belongs to the set of users;
determining, for each simulated historical action indicated by the second data, a second likelihood of use by the user at a later time point;
training, based at least on the first and second likelihoods, a neural network model configured to determine a user forecast indicative of a set of future actions to be performed by the user, wherein the neural network comprises an input layer, a hidden layer, and an output layer;
determining, based on accessing the neural network model, a user forecast of a first user, wherein the user forecast is indicative of a set of future actions to be performed by the first user through the application at a later time point, and the user forecast includes a set of data metrics accessible through the application;
obtaining, for each data metric of the user forecast of the first user, an importance score, wherein the importance score is based on frequency of use of a respective data metric by the first user;
selecting, based on the importance score for each of the data metrics, a subset of data metrics from the set of data metrics, wherein the subset of data metrics only includes data metrics that are predicted to be used by the first user in a data processing operation at the later time point;
generating a metric table, wherein the metric table includes a set of quantitative information, wherein each quantitative information is associated with a corresponding one of the data metrics of the subset of data metrics, and wherein generating the metric table comprises:
transforming the first data and the second data into a star schema that includes one or more fact tables;
determining, based on applying a first data metric to the star schema, first quantitative information for the first data metric included in the subset of data metrics, wherein the first data metric is associated with a first future action included in the set of future actions;
determining, based on applying a second data metric to the star schema, second quantitative information for the second data metric included in the subset of data metrics, wherein the second data metric is associated with a second future action that is (i) included in the set of future actions and (ii) different from the first data metric;
determining, based on the first and the second quantitative information, aggregated quantitative information; and
storing the first quantitative information, the second quantitative information, and the aggregated quantitative information in the metric table; and
providing the metric table, wherein the metric table is accessible before the set of future actions is performed by the first user.

10. The system of claim 9, wherein:
the input layer includes a plurality of input nodes each of which receives a subset of the data indicating historical actions performed by the user through the application, each subset representing a different feature of user behavior exhibited by the user when previously using the application;
the hidden layer includes a plurality of hidden nodes that each approximates the set of future actions based on a trained statistical model for the user; and
the output layer includes one or more output nodes that determine the set of future actions.

11. The system of claim 9, wherein the operations comprise:
after determining the user forecast of the first user, receiving, by the one or more computers, data indicating one or more products associated with the first user;
identifying, by the one or more computers and using the neural network model, a second subset of data metrics, from among the set of data metrics, that correspond to the one or more products associated with the first user;
determining, by the one or more computers, that the user forecast of the first user has changed based on the second subset of data metrics; and
in response to determining that the user forecast of the first user has changed, adjusting, by the one or more computers, the user forecast of the first user based at least on the data indicating one or more products.

12. The system of claim 9, wherein the set of historical actions performed by the set of users comprises prior data metrics computed by the set of users through the application.

13. A non-transitory computer storage device encoded with a computer program, the computer program comprising instructions that when executed by one or more computers cause the one or more computers to perform operations comprising:
obtaining first data indicative of a set of historical actions performed by a set of users through an application;
generating, based on clustering the first data, second data indicative of a set of simulated historical actions performed by the set of users, wherein the second data reproduce statistical properties of the first data;
determining, for each historical action indicated by the first data, a first likelihood of use by a user at a later time point, wherein the user belongs to the set of users;
determining, for each simulated historical action indicated by the second data, a second likelihood of use by the user at a later time point;
training, based at least on the first and second likelihoods, a neural network model configured to determine a user forecast indicative of a set of future actions to be performed by the user, wherein the neural network comprises an input layer, a hidden layer, and an output layer;

determining, based on accessing the neural network model, a user forecast of a first user, wherein the user forecast is indicative of a set of future actions to be performed by the first user through the application at a later time point, and the user forecast includes a set of data metrics accessible through the application;

obtaining, for each data metric of the user forecast of the first user, an importance score, wherein the importance score is based on frequency of use of a respective data metric by the first user;

selecting, based on the importance score for each of the data metrics, a subset of data metrics from the set of data metrics, wherein the subset of data metrics only includes data metrics that are predicted to be used by the first user in a data processing operation at the later time point;

generating a metric table, wherein the metric table includes a set of quantitative information, wherein each quantitative information is associated with a corresponding one of the data metrics of the subset of data metrics, and wherein generating the metric table comprises:

transforming the first data and the second data into a star schema that includes one or more fact tables;

determining, based on applying a first data metric to the star schema, first quantitative information for the first data metric included in the subset of data metrics, wherein the first data metric is associated with a first future action included in the set of future actions;

determining, based on applying a second data metric to the star schema, second quantitative information for the second data metric included in the subset of data metrics, wherein the second data metric is associated with a second future action that is (i) included in the set of future actions and (ii) different from the first data metric;

determining, based on the first and the second quantitative information, aggregated quantitative information; and storing the first quantitative information, the second quantitative information, and the aggregated quantitative information in the metric table; and providing the metric table, wherein the metric table is accessible before the set of future actions is performed by the first user.

14. The non-transitory computer storage device of claim 13, wherein:

the input layer includes a plurality of input nodes each of which receives a subset of the data indicating historical actions performed by the user through the application, each subset representing a different feature of user behavior exhibited by the user when previously using the application;

the hidden layer includes a plurality of hidden nodes that each approximates the set of future actions based on a trained statistical model for the user; and the output layer includes one or more output nodes that determine the set of future actions.

15. The non-transitory computer storage device of claim 13, wherein the operations comprise:

after determining the user forecast of the first user, receiving, by the one or more computers, data indicating one or more products associated with the first user;

identifying, by the one or more computers and using the neural network model, a second subset of data metrics, from among the set of data metrics, that correspond to the one or more products associated with the first user;

determining, by the one or more computers, that the user forecast of the first user has changed based on the second subset of data metrics; and in response to determining that the user forecast of the first user has changed, adjusting, by the one or more computers, the user forecast of the first user based at least on the data indicating one or more products.

* * * * *